INVENTOR.
CHARLES E. LENZ
ATTORNEY

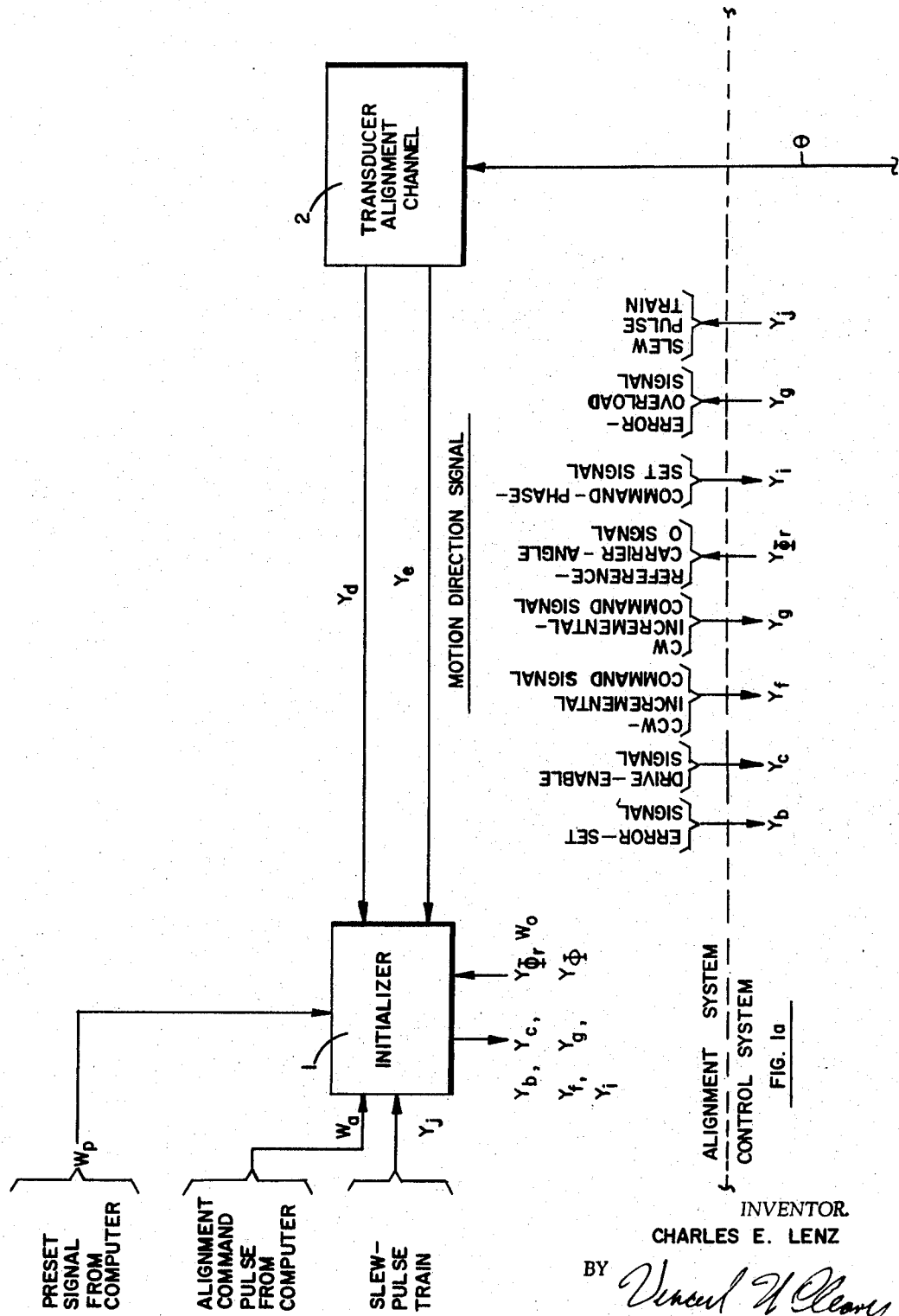

June 11, 1968  C. E. LENZ  3,388,304
DIGITAL SERVOMECHANISM ALIGNMENT SYSTEM
Filed Oct. 2, 1964  9 Sheets-Sheet 4

INVENTOR.
CHARLES E. LENZ
BY *Vincent Wilson*
ATTORNEY

INVENTOR.
CHARLES E. LENZ
ATTORNEY

June 11, 1968     C. E. LENZ     3,388,304
DIGITAL SERVOMECHANISM ALIGNMENT SYSTEM
Filed Oct. 2, 1964     9 Sheets-Sheet 8

INVENTOR.
CHARLES E. LENZ
BY
ATTORNEY

United States Patent Office 3,388,304
Patented June 11, 1968

3,388,304
DIGITAL SERVOMECHANISM
ALIGNMENT SYSTEM
Charles E. Lenz, Fullerton, Calif., assignor to North American Rockwell Corporation, a corporation of Delaware
Filed Oct. 2, 1964, Ser. No. 401,176
9 Claims. (Cl. 318—18)

ABSTRACT OF THE DISCLOSURE

A digital alignment system which operates with an incremental digital position control system of the phase comparison type. The alignment system functions by moving an output shaft towards a reference position until it is within a predetermined number of radians of that position. The control system input command is then changed to a predetermined fixed value. The output shaft is subsequently released to the control of the incremental digital servomechanism allowing the output shaft to be driven to the alignment position with the full accuracy of the digital control system and without error due to the alignment system.

---

This invention relates to an alignment system and more particularly to a digital servomechanism alignment system for significantly increasing the effective accuracy of an incremental digital positioning-type servomechanism by completely eliminating the alignment system error component from the total error of the system.

The alignment system is specifically designed for use with an incremental phase-comparison angular-position-control system such as the type shown, disclosed and claimed in applicant's co-pending application Ser. No. 395,530 filed Sept. 10, 1964, entitled, "Digital Position Control System," assigned to North American Aviation, Inc., the assignee of this invention. The alignment system may also be used with equivalent types of angular or linear-position-control systems.

The above referenced system utilizes a single output transducer which yields a phase-modulated carrier with the phase varying $n$ times the amount by which the output shaft angle varies, where $n$ is an integer greater than 1.

An alignment system is essential with an angular or linear-position-control system using a transducer of the type described which provides an ambiguous output, since otherwise the output shaft would go to whichever of the $n$ stable nulls was nearest to the shaft position at the time of power application.

The alignment system is used to accurately establish the reference position from which an incremental digital positioning servomechanism must measure relative position to determine absolute position.

The present invention eliminates the mechanical means, such as a stop, which are normally employed to establish the point from which all positions are measured by an incremental position-control system. In typical cases involving control systems of extreme accuracy, accuracy is improved by an order of magnitude or better due to elimination of such difficulties as mechanical wear and deformation.

In the present invention, the actual location of the starting or reference position is established by the main phase-comparison control loop, rather than by the alignment system. Thus, the precautions and relative expense of achieving extreme accuracy are confined to the main phase-comparison control loop, where they are otherwise necessary, and the transducer alignment channel can be relatively inaccurate and easily adjustable.

Also, final factory adjustment of the starting or reference position can be made by electrical, rather than mechanical means. Such electrical adjustment can be made in smaller increments than would be practical mechanically.

This type of alignment system will operate with a variety of incremental digital position-control systems of the phase-comparison type in which both the incremental digital input command and the output shaft angle $\theta_0$ are converted to phase shifts of a reference carrier. In a normal single-speed phase-comparison servomechanism in which the output carrier-phase shift is $\phi_0 = n\theta_0$, where $n$ is a positive integer, $n$ separate null positions will exist for the output shaft for any given input command. The alignment system upon receiving an alignment-command pulse functions by moving the output shaft toward the reference position until it is within $\pm \pi/n$ radians of that position, then changes the control-system input command to zero (or other predetermined value), and finally releases the output shaft to the control of the phase-comparison servomechanism. The output shaft will then be driven to the reference position with the full accuracy of the servomechanism without error due to the alignment system. Since an incremental digital positioning type control system positions by moving a known number of fixed increments from a known starting or reference position, the total position error includes the error of the starting position plus the error in the distance moved; the former error has now been greatly reduced.

In general, initial construction, factory adjustment, and later maintenance of the alignment system are simpler and more economical than otherwise possible because of the alignment concepts employed herein. These benefits result from elimination of mechanical stops, the possibility of electrically adjusting the alignment position in smaller increments than practical by mechanical means, and the relatively wide tolerances permissible in the alignment channel, typically exceeding by over an order of magnitude the tolerances permissible in the main phase-comparison control loop. Since alignment is automatic after the alignment system receives an alignment-command pulse, no elaborate programming of an associated digital computer is needed. Maximum use is made of digital techniques which rely only on the presence or absence of a signal, rather than on signal amplitude.

It, therefore, is an object of this invention to provide an automatic alignment system for use with an incremental digital servo.

It is, therefore, another object of this invention to provide an alignment system for completely eliminating the alignment system error component from the total error of an incremental digital positioning-type servomechanism.

It is a further object of this invention to provide an alignment system which requires no elaborate programming of an associated digital computer.

It is still another object of this invention to provide an alignment system which eliminates the use of mechanical stops.

It is yet another object of this invention to provide in an alignment system a means for electrically adjusting the alignment reference position in smaller increments than practical by mechanical means.

These and other objects of the present invention will become apparent from the following description read in connection with the accompanying drawings in which:

FIG. 1a is a block diagram of the alignment system;

THE SYSTEM AND BASIC COMPONENTS

In FIG. 1a are the basic components of the alignment system, the initializer 1 and the transducer alignment channel 2. The initializer 1 is a combination of logic elements which, upon receiving an alignment-command pulse $W_a$ from an associated digital computer or other source, generates to the associated incremental phase-comparison control system the sequence of logic signals necessary to cause the control system to move the output shaft 23 to the reference position from which all subsequent motion will be measured. Slew-pulse train $Y_j$ is also required by the initializer; during alignment, this pulse train is applied to the proper incremental-command input of the control system to cause movement toward the reference position at a predetermined rate.

The transducer alignment channel 2 has as its input the control-system shaft angle $\theta_0$. The outputs of the transducer alignment channel are the logic signals $Y_d$ and $Y_e$, only one of which can be true at any given time. When true, $Y_d$ or $Y_e$ indicates the preferred direction of rotation of the output shaft 23 to the reference position to be counterclockwise or clockwise, respectively. Within a small angle or sector which includes the reference position, $Y_d = Y_e = 0$. Signals $Y_d$ and $Y_e$ are applied to the initializer 1. The sector within which $Y_d = Y_e = 0$ must extend less than $\pi/n$ radians in either direction from the reference position, where $n$ is the ratio of carrier phase shift produced by the output-shaft-angle phase encoder 22 to the corresponding angular position $\theta_0$ of the output shaft 23.

A sine wave is defined herein as being in phase with a logical square wave of the same frequency when each positive (negative) slope zero crossing of the former occurs at the same instant as each false-true (true-false) jump of the latter. Thus the normal output of a binary counter is in phase with a sine wave only if the initial count at time $t=0+$ is 10 . . . 0.

In this discussion, upper case symbols are used to denote logical variables, discrete-valued voltages, and constant source voltages. All other voltages will be denoted by lower-case symbols.

Figure 1B:
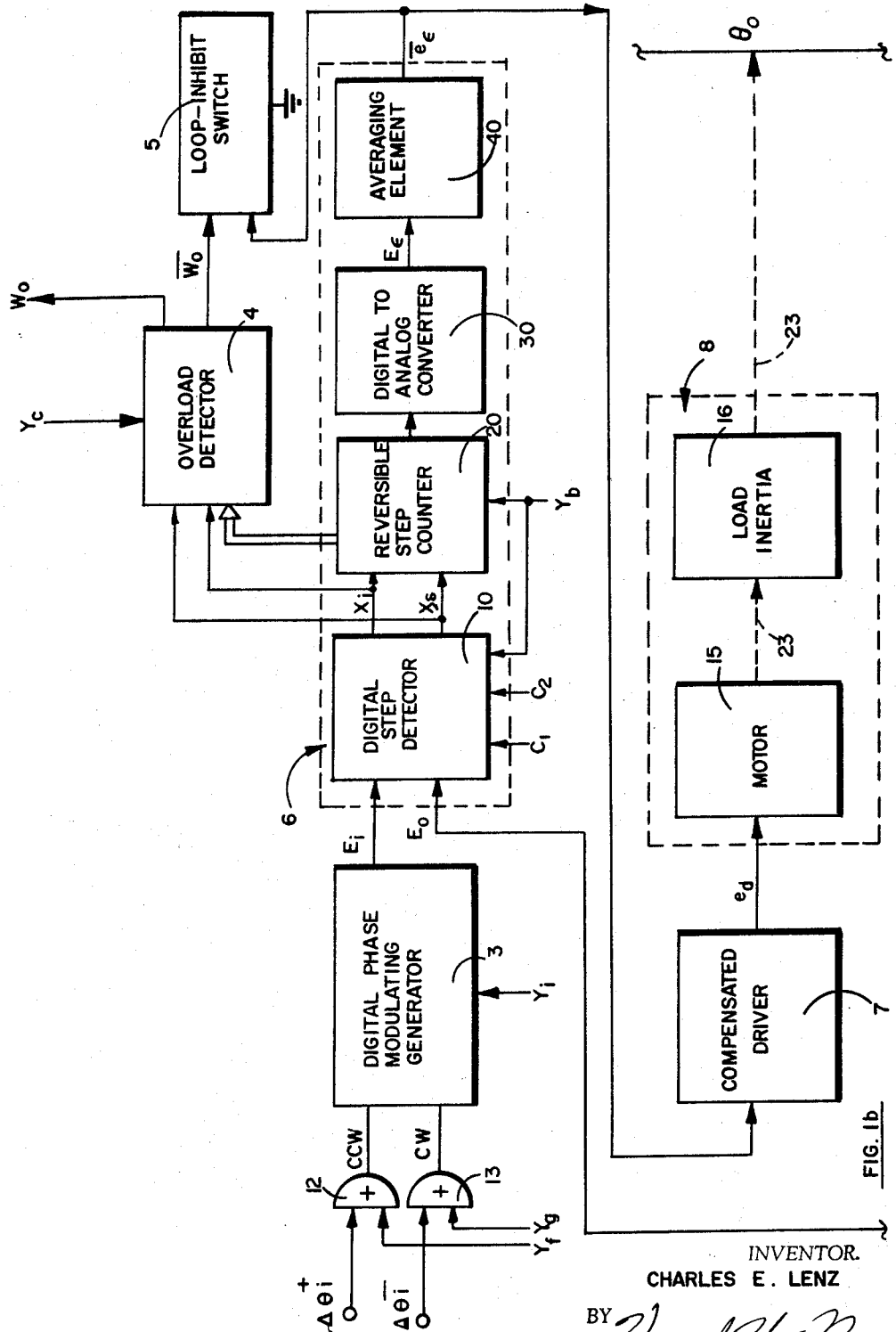
FIG. 1b is a partial block diagram of a phase-comparison angular-position-control system.
Figure 1C:
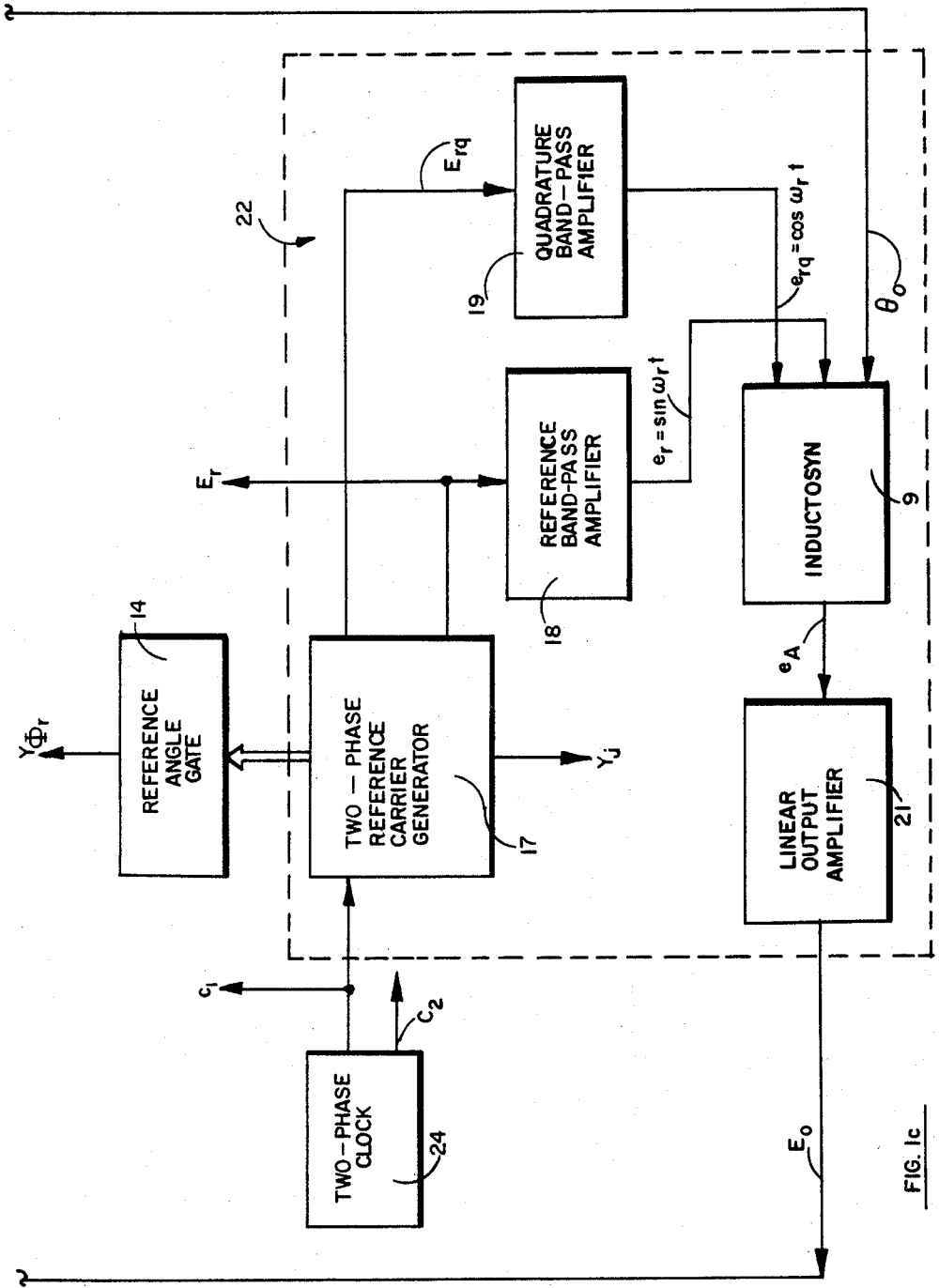
FIG. 1c is a partial block diagram of a phase-comparison angular-position-control system.

The incremental phase-comparison angular-position-control system illustrated in FIGS. 1b and 1c is similar to applicant's "Digital Position Control System" referenced previously. Modifications made to that system to adapt it to the present invention will be described in this description in logical order.

The digital phase-modulating generator 3 generates a phase-modulated square-wave output $E_i$.

The phase of $E_i$ is advanced or retarded by an increment $2\pi/m_1$ electrical radians in response to each input pulse from a computer (not shown) applied to the counterclockwise or clockwise input terminals $\Delta\theta^+{}_i$ and $\Delta\theta^-{}_i$, respectively, where $m_1$ is a positive integer dependent upon the digital phase-modulating generator design.

The OR-gates 12 and 13 act as summing points to allow the signals $Y_f$ and $Y_g$ to be inserted into the phase modulating generator while affording a degree of separation between the sources of these input signals and the signals present on the input terminals. Standard OR-gates well known to those persons skilled in the art may be used for components 12 and 13.

The output-shaft-angle phase encoder 22 shifts the phase of $E_0$ by an angle $\phi_0 = n\theta_0$, where $\theta_0$ is the output shaft angle. The output $E_0$ of the phase encoder is the feedback signal for the phase-comparison servomechanism loop.

The output-shaft-angle phase encoder 22 consists of a two-phase reference-carrier generator 17 which supplies two square waves, $E_r$ and $E_r q$, equal and fixed in frequency but separated in phase by 90 degrees. The frequency of the signal $E_i$ at the output of the phase-modulating generator is equal to that of the square wave $E_r$ when the angular output velocity, $\dot{\theta}_0$, of shaft 23 equals zero. The square wave $E_r$ is applied to the reference bandpass amplifier 18 which allows the sinusoidal component of the square wave to be passed and amplified and appear at amplifier 18's output as a signal $e_r = \sin \omega_r t$. The square wave $E_r q$ applied to the quadarture bandpass amplifier 19 which allows the sinusoidal component of the square wave to be passed and amplified and appear at amplifier 19's output as a signal $e_r q = \cos \omega_r t$. The carrier generator 17 also supplies the necessary signals to the reference-angle gate 14. The reference-angle gate 14 supplies to the initializer 1 the signal $Y\Phi_r$ which is true only when the reference-carrier angle is between specified limits. The carrier generator can also supply the slew-pulse-train signal $Y_j$.

The "Inductosyn" 9 receives the shaft angle $\theta_0$ and the outputs from amplifiers 18 and 19. It operates upon these inputs to supply a signal $e_A$, which in turn is amplified by the linear output amplifier 21. The error signal $E_0$ appears at the output of this amplifier.

The two-phase clock 24 provides the two pulse trains, $C_1$ and $C_2$, of constant and equal repetition rates. The pulse train $C_1$ is normally employed for triggering flip-flops, while $C_2$ is used both for interrogation to determine the states of flip-flops after settling and for override resetting of flip-flops. The reference-carrier generator 17 is synchronized by the clock signal $C_1$.

The digital phase comparator 6 provides a discrete-valued output voltage $E_\epsilon$ of average value $\bar{e}_\epsilon$ proportional to the quantized phase difference between $E_i$ and $E_0$. These phase angles of $E_i$ and $E_0$ will be defined as $\phi_i$ and $\phi_0$ respectively, and the phase difference between $\phi_i$ and $\phi_0$ will be defined as $\phi_\epsilon$.

The phase comparator contains a digital step detector 10 for providing an up-count pulse at $X_i$ to the reversible step counter 20 in response to each positive step of input $E_i$ and to provide a down-count pulse at $X_\delta$ to that counter in response to each negative step of input $E_0$. The pulses provide are from the clock train $C_1$. The pulse train $C_2$ is used to override reset the flip-flops in the step detector. Also contained within the phase comparator is a reversible step counter 20 which increments one count for each false-true jump of $E_i$, and which decrements one count for each true-false jump of $E_0$. The action of the counter is cyclic, and its count $C_\epsilon$ is between 1 . . . 1 and 0 . . . 0 for $1\phi_\epsilon 1 < \pi$. The count $C_\epsilon$ is converted instantaneously to the voltage $E_\epsilon$ in the digital-to-analog converter 30 by weighting the most significant bit negatively, by weighting all other bits positively, and by adding a bias equal to one-half the bit voltage. The voltage $E_\epsilon$ is then averaged in the averaging element 40 and appears at its output as the voltage $\bar{e}_\epsilon$. The phase comparator 6 also supplies signals to the overload detector 4 (refer to FIG. 7). Contained within the overload detector is an error overload flip-flop $F_{24}$ which is set if the magnitude of the phase angle $\phi_\epsilon$ rises sufficiently to overload the reversible step counter 20 and thereby cause a permanent error. This flip-flop can be reset only by the alignment system. The normal output of the flip-flop is $W_0$, a signal which is direct both to the computer (not shown) and to the alignment system. The complement output is $\overline{W}_o$, a signal which is directed to the loop-inhibit switch 5. The loop-inhibit switch shorts the output $\overline{e}_\epsilon$ to ground to disable the phase-comparison servomechanism loop. The servo loop is enabled only when $W_o=0$.

The compensated driver 7 provides a continuously variable output voltage $e_d$ proportional in the steady state to the average value of $E_\epsilon$ over a cycle of this voltage. In addition, this component provides the compensation necessary to yield required stability, transient response, and steady-state stiffness. The output voltage $e_d$ is furnished at a suitable power level to drive the torque motor 15.

The electromechanical system 8 includes the torque motor 15 which is connected to the output shaft 23. The angular position of the output shaft is $\theta_o$, a quantity which is directed to both the output-shaft-angle encoder 22 and the transducer alignment channel 2. The load inertia 16 which may be a telescope, rack, etc., is driven by the output shaft 23.

To permit explanation of the operation of the digital alignment system with an associated digital position-control system, certain of the significant *variables* involved will now be defined analytically. First, the incremental input-command signals $\Delta\theta^+_i(t)$ and $\Delta\theta^-_i(t)$ will be derived from the continuous input variable $\theta_i(t)$. The electrical angles by which information is transmitted in the phase-comparison type of digital position-control system being considered will then be discussed. For this purpose, both the total electrical and relative phase angles of a logical square wave will be defined as equal to the corresponding angles of the fundamental sinusoidal component of that square wave. The first electrical angle to be considered will be the total angle $\Phi_r(t)$ of the reference carrier $E_r(t)$; all phase angles are measured relative to this angle. Next, the total and relative-phase angles $\Phi_i(t)$ and $\phi_i(t)$ of the input carrier $E_i(t)$ will be defined, along with the corresponding angles $\Phi_o(t)$ and $\phi_o(t)$ of the output carrier $E_o(t)$. An error-phase angle $\phi_\epsilon(t)$ will also be defined. Finally, an analytic expression for the average value of the phase-decoder output $E_\epsilon(t)$ over a cycle will be developed.

Figure 8:
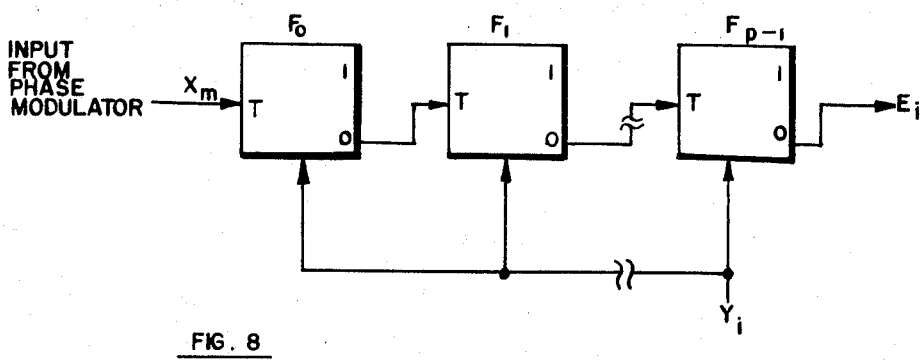
FIG. 8 is a logic diagram of the variable-phase generator.

In the following discussion an analytical expression for the incremental input signals $\Delta\theta^+_i(t)$ and $\Delta\theta^-_i(t)$ will be developed. Let the input command $\theta_i(t)$ be an analytic function at every point on the time or $t$ axis such that $$-\frac{\pi}{m_1 n} \leq \theta_i(0) < \frac{\pi}{m_1 n} \quad (1)$$

where the positive integer $n$ equals the electrical speed of the output transducer 22 and the even positive integer $m_1$ equals the number of states of the variable-phase generator in the phase-modulating generator. (F. B. Hildebrand, Advanced Calculus. New York: Prentice-Hall, 1949, pp. 496–499. Here it is assumed that $\theta_i(t)$ is single-valued and has finite derivatives of all orders for all real values of $t$.) The variable-phase generator is illustrated in FIG. 8 and is contained within the phase-modulating generator 3 which is disclosed in detail in applicant's co-pending application Ser. No. 368,090 filed May 18, 1964, now U.S. Patent No. 3,316,503, entitled "Digital Phase Modulated Generator." A function $y(\theta_i)$ will be defined as follows:

$$y(\theta_i) = \tfrac{1}{2}\left(\frac{m_1 n \theta_i}{\pi} + 1\right) \quad (2)$$

The corresponding jump function is (Murray F. Gardner and John L. Barnes, Transients in Linear Systems. New York: John Wiley & Sons, Inc., 1952, pp. 287–288).

$$\mathcal{J} y(\theta_i) = \int \tfrac{1}{2}\left(\frac{m_1 n \theta_i}{\pi} + 1\right) \equiv z \quad (3)$$

In accordance with the reference cited, a jump function assumes the largest integral value less than or equal to its argument, in this case $\tfrac{1}{2}(m_1 n \pi^{-1}\theta_i + 1)$. The reference states that for "a jump function the value at a discontinuity will be taken as the value of the function as the argument approaches the point of discontinuity from the right." (Supra, p. 287.) Care is necessary when a jump function is evaluated at a discontinuity, however, if the argument is a dependent variable, as is the case in Relation 3 if $\theta_i$ is expressed as a function of the independent variable $t$. If the definition $$z(t) = \mathcal{J} y[\theta_i(t)] \quad (4)$$

is made, it follows that if a discontinuity of $z(t)$ occurs within a vanishingly small distance from $t=t_a$, then $z(t_a)=z(t_a+\delta)$ if $\dot{\theta}_i(t_a)>0$, and $z(t_a)=z(t_a-\delta)$ if $\dot{\theta}_i(t_a)<0$. Here $\delta$ is a vanishingly small positive increment of time. The conditions $\dot{\theta}_i(t_a)=0$ can lead either to $$z(t_a)=z(t_a+\delta)$$

to $z(t_a)=z(t_a-\delta)$ or to $z(t_a+\delta) \neq z(t_a) \neq z(t_a-\delta)$, depending upon the values of the second and higher-order derivatives of $\theta_i(t)$ at $t_k$.

The jump function $z(t)$ will next be resolved into two component jump functions, $z^+(t)$ and $z^-(t)$, which increase and decrease monotonically with time, respectively, in such a manner that $$z^+(t) + z^-(t) = z(t) \quad (5)$$

The initial-condition and backward-difference relations $$z^+(0) = z^-(0) = 0 \quad (6)$$

$$\underset{b}{\overset{\Delta}{}} z^+(t) = \underset{\delta \to 0}{\lim}[z^+(t)-z^+(t-\delta)] \equiv \begin{bmatrix} \underset{b}{\overset{\Delta}{}} z(t), & \underset{b}{\overset{\Delta}{}} z(t) \geq 0 \quad (7a) \\ 0, & \underset{b}{\overset{\Delta}{}} z(t) < 0 \quad (7b) \end{bmatrix}$$

and $$\underset{b}{\overset{\Delta}{}} z^-(t) = \underset{\delta \to 0}{\lim}[z^-(t)-z^-(t-\delta)] \equiv \begin{bmatrix} \underset{b}{\overset{\Delta}{}} z(t), & \underset{b}{\overset{\Delta}{}} z(t) \leq 0 \quad (8a) \\ 0, & \underset{b}{\overset{\Delta}{}} z(t) > 0 \quad (8b) \end{bmatrix}$$

will be assumed for $z^+(t)$ and $z^-(t)$, where the backward difference $$\underset{b}{\overset{\Delta}{}} z(t)$$

is defined as $$\underset{b}{\overset{\Delta}{}} z(t) \equiv \underset{\delta \to 0}{\lim}[z(t)-z(t-\delta)] \quad (9)$$

Thus $$z^+(t) = \sum_{\xi=0}^{t} \underset{b}{\overset{\Delta}{}} z^+(\xi) \quad (10)$$

and $$z^-(t) = \sum_{\xi=0}^{t} \underset{b}{\overset{\Delta}{}} z^-(\xi) \quad (11)$$

The jump functions $z^+(t)$ and $z^-(t)$ are uniquely defined by either of two combinations of the preceding relations. Relations 6 through 9 form one such combination; Relations 7a through 11 form the other. Relations 1 through 3 are pertinent in either case.

A constraint must be placed upon the minimum time between consecutive jumps of $z(t)$ of the same polarity to permit accurate operation of the phase-modulating generator. Let the time at which the $k$th jump of $z(t)$ for $t>0$ occurs be designated $t_k$, where $k$ is a positive integer. If, and only if, the jump of $z(t)$ at $t_{k+p}$ is of the same polarity as that at $t_k$, $$\left[\underset{b}{\overset{\Delta}{}} z(t_k)\right]\left[\underset{b}{\overset{\Delta}{}} z(t_{k+p})\right] = 1 \quad (12)$$

where $0 < p \leq 2$ is an integer. Whenever Relation 12 applies, for accurate operation of the cnotrol system it is necessary to satisfy a relation of the form $$t_{k+p} - t_k = \tau_i + \tau_d \quad (13)$$

where $\tau_i$ is the standardized length of input pulses applied to the position-control system, and $\tau_d$ is a delay dependent upon the design of the phase-moulating generator 3.

The input increment and decrement signals applied to the position-control system are designated $\Delta\theta^+_i(t)$ and $\Delta\theta^-_i(t)$, respectively. Both $\Delta\theta^+_i(t)$ and $\Delta\theta^-_i(t)$ and normally false two-level logical signals consisting of pulses of duration $\tau_i > 0$. These two input signals may be described analytically by the relations $$\Delta\theta_i^+(t) = z^+(t) - z^+(t - \tau_i) \quad (14)$$

and $$\Delta\theta_i^-(t) = z^-(t - \tau_i) - z^-(t) \quad (15)$$

where the algebraic and logical values of $\Delta\theta_i^+(t)$ and $\Delta\theta_i^-(t)$, respectively, and assumed equal. Each pulse of $\Delta\theta_i^+(t)$ or $\Delta\theta_i^-(t)$, respectively, is a command to the control system to increase or decrease the output shaft angle by $2\pi m_1^{-1} n^{-1}$ radian. The value of $\theta_i(t)$, quantized with a width of $2\pi m_1^{-1} n^{-1}$ radian, is given by $$\theta_i(t) = \frac{2\pi}{m_1 n_1 \tau} \int_0^t [\theta^+_i(\xi) - \Delta\theta^+_i(\xi)]d\xi \pm \frac{\pi}{m_1 n} \quad (16)$$

for any value of $t > 0$ for which the logical relation $$\Delta\theta_i^+(t) + \Delta\theta_i^-(t) = 0 \quad (17)$$

applies.

A slightly different viewpoint is obtained by proceeding from Relation 3 and defining two functions as follows:

$$y^+(t) = y(t) - \sum_{\xi=0}^{t} \overset{\Delta}{b} z^-(\xi) \quad (18)$$

$$y^-(t) = y(t) - \sum_{\xi=0}^{t} \overset{\Delta}{b} z^+(\xi) \quad (19)$$

where $y$, $\overset{\Delta}{b} z^+$, and $\overset{\Delta}{b} z^-$ are defined by Relations 2 and 7a through 8b. It is then possible to write $$z^+(t) = \int y^+(t) \quad (20)$$

and $$z^-(t) = \int y^-(t) \quad (21)$$

resulting in tangible arguments for the jump functions $z^+(t)$ and $z^-(t)$. Relations 12 through 17 continue to apply.

The next topic to be discussed will be definition of the *electrical angles* by which information is transmitted.

All phase angles are measured relative to the fundamental sinusoidal component $e_r(t)$ of the logical reference carrier $E_r(t)$. If the peak-to-peak amplitude of $E_r(t)$ is taken as 1, then $$e_r(t) = k_1 \sin \Phi_r(t) \quad (22)$$

where $$\Phi_r(t) = \omega_r t \quad (23)$$

Here $$k_1 = 2/\pi$$

$$\omega_r = 2\pi/m_1 \tau$$

and $t$ = elapsed time

In these definitions, the positive integer $m_1$ equals the number of states of the variable-phase generator contained within the phase-modulated generator 3, and $\tau$ is the clock period.

Similarly, an expression for the fundamental sinusoidal component of the input carrier $E_i(t)$ may be written as $$e_i(t) = k_1 \sin \Phi(t) \quad (24)$$

where $$\Phi_i(t) = \omega_r t + \phi_i(t) \quad (25)$$

All symbols used here were previously defined except $\phi_i(t)$;

$\phi_i(t)$ = the relative phase angle of the input-command carrier

The input phase angle $\phi_i(t)$ is related to the input command $\theta_i(t)$ in the following manner:

$$\phi_i(t) = \frac{2\pi}{m_1} \int \frac{m_1 n \theta_i(t)}{2\pi} \pm \epsilon_i(t) \quad (26)$$

The error $\epsilon_i(t)$ is due to the time delay of the phase-modulated generator in responding to the incremental input-command signals $\Delta\theta_i^+(t)$ and $\Delta\theta_i^-(t)$. In general, $\epsilon_i(t)$ is so bounded that $$|\epsilon_i(t)| = 2\pi/m_1 \quad (27)$$

Moreover, in the steady state with $\theta_i(t) = 0$, $\epsilon_i(t) = 0$.

The fundamental sinusoidal component of the output carrier $E_o(t)$ is $$e_o(t) = k_1 \sin \Phi_o(t) \quad (28)$$

where $$\Phi_o(t) = \omega_r t + \phi_o(t) \quad (29)$$

Here $\phi_o(t)$ = the relative phase angle of the output carrier

The output phase angle $\phi_o(t)$ is determined by the output shaft angle $\theta_o(t)$ according to the relation $$\phi_o(t) = n\theta_o(t) \quad (30)$$

where $n$ = the speed of the output transducer

An error phase angle may also be defined to which the phase comparator 6 is approximately responsive. This variable is given by the relation $$\phi_\epsilon(t) = \phi_i(t) - \frac{2\pi}{m_1} \int \frac{m_1 \phi_o(t)}{2\pi} \quad (31)$$

Although $\phi_o(t)$ is a continuous function of time, quantization indicated by the jump function in Relation 31 occurs in the phase comparator.

The purpose of the following analysis is to develop an expression for the average value $\bar{e}_\epsilon(t)$ over an output cycle of the discrete two-level *phase comparator output* $E_\epsilon(t)$. The quantity $\bar{e}_\epsilon(t)$ is to be expressed as a function of the phase angles $\phi_i(t)$ and $\phi_o(t)$ of the two logical input signals $E_i(t)$ and $E_o(t)$.

Here all phase angles will be measured relative to a logical square-wave reference carrier $E_r(t)$. The phase of a logical square wave will be defined as equal to the phase angle of its fundamental sinusoidal component. For $E_i(t)$, $E_o(t)$, and $E_r(t)$ these components are, respectively, $$e_i(t) = k_1 \sin [\omega_r t + \phi_i(t)] \quad (32)$$

$$e_o(t) = k_1 \sin [\omega_r t + \phi_o(t)] \quad (33)$$

$$e_r(t) = k_1 \sin \omega_r t \quad (34)$$

This treatment will be limited to the case $$|\phi_i(t) - \phi_o(t)| < \pi \quad (35)$$

Under this condition positive steps of $E_i(t)$ and negative steps of $E_o(t)$ always alternate in time of occurrence. The phase comparator discussed produces the constant-magnitude output of varying sign $$E_\epsilon(t) = \begin{cases} A, & t^+_k < t \leq t^-_k, k > 0 \quad (36a) \\ -A, & t^-_k < t \leq t^+_{k+1}, k > 0 \quad (36b) \end{cases}$$

where $A$ is a positive constant. The quantities $t^+_k$ and $t^-_k$ are the times of the $k$th positive and negative steps of $E_i(t)$ and $E_o(t)$, respectively, where $k$ is a positive integer. In accordance with Relations 36a and 36b, the $k$th positive and negative steps of $E_\epsilon(t)$ also occur at approximately $t^+_k$ and $t^-_k$, respectively, if the slight delay of the phase comparator is neglected. Initial conditions are so established that $$t^+_1 = 0 \quad (37)$$

In normal applications the trigonometric argument $\omega_r t + \phi_i(t)$ in Relation 32 is a monotonically increasing function of time so that $$\dot{\phi}_i(t) \geq -\omega_r \quad (38)$$

Only the case where this restriction and the restriction $$\dot{\phi}_o(t) \geq -\omega_r \quad (39)$$

apply will be considered. The limit imposed upon the maximum absolute value of $\dot{\phi}_i(t)$ by the response of the phase-modulated generator is normally more severe than that imposed by Relation 38. From the preceding definition of phase comparator operation, it follows that $$\omega_r t^+_k + \phi_i(t^+_k) = 2\pi(k-1), \; k > 0 \quad (40)$$

$$\omega_r t^-_k + \phi_o(t^-_k) = \pi(2k-1), \; k > 0 \quad (41)$$

Symbols for the duration of the positive part, the duration of the negative part, and the total duration of the $k$th cycle of the phase decoder output $E_\epsilon(t)$ will now be defined, respectively, as $$\tau^+_{\epsilon k} \equiv t^-_k - t^+_k \quad (42)$$

$$\tau^-_{\epsilon k} \equiv t^+_{k+1} - t^-_k \quad (43)$$

$$\tau_{\epsilon k} \equiv \tau^+_{\epsilon k} + \tau^-_{\epsilon k} = t^+_{k+1} - t^+_k \quad (44)$$

Using these definitions, it follows that the average value of the output signal $E_\epsilon(t)$ over the $k$th cycle is $$\bar{e}_{\epsilon k} = \frac{A(\tau^+_{\epsilon k} - \tau^-_{\epsilon k})}{\tau_{\epsilon k}} = \frac{A(2t^-_k - t^+_k - t^+_{k+1})}{t^+_{k+1} - t^+_k} \quad (45)$$

It is now useful to define the transition times in the preceding relation in terms of their displacements from corresponding transition times of the reference carrier $E_r(t)$. The displacement of the $k$th positive step of $E_r(t)$ will be defined as $$\Delta t^+_k \equiv (k-1)\tau_r - t^+_k, \; k > 0 \quad (46)$$

where $$\tau_r = 2\pi/\omega_r \quad (47)$$

Similarly, the displacement of the $k$th negative step of $E_o(t)$ from the $k$th negative step of $E_r(t)$ will be defined as $$\Delta t^-_k \equiv (k - \tfrac{1}{2})\tau_r - t^-_k, \; k > 0 \quad (48)$$

Substituting values of $t^+_k$ and $t^-_k$ derived from Relations 46 and 48 into Relation 45 yields $$\bar{e}_{\epsilon k} = \frac{A(\Delta t^+_k + \Delta t^+_{k+1} - 2\Delta t^-_k)}{\Delta t^+_k - \Delta t^+_{k+1} - \tau_r} \quad (49)$$

If expressions for $t^+_k$ and $t^-_k$ from Relations 40 and 41 are substituted into Relation 46 and 48, it follows that $$\Delta t^+_k = \phi_i(t^+_k)/\omega_r \quad (50)$$

$$\Delta t^-_k = \phi_o(t^-_k)/\omega_r \quad (51)$$

From substitution of Relations 50 and 51 into Relation 49, there now results $$\bar{e}_{\epsilon k} = \frac{2A\{\tfrac{1}{2}[\phi_i(t^+_k)] + \phi_i(t^+_{k+1})] - \phi_o(t^-_k)\}}{2\pi - [\phi_i(t^+_{k+1}) - \phi(t^+_k)]}$$

$$= \frac{2A[\bar{\phi}_{ik} - \phi_o(t^-_k)]}{2\pi - \Delta\phi_{ik}} \quad (52)$$

where $\bar{\phi}_{ik} =$ the average of the initial and final values of $\phi_i(t)$ for the $k$th cycle of $E_\epsilon(t)$ and $\Delta\phi_{ik} =$ the net variation of $\phi_i(t)$ during the $k$th cycle of $E_\epsilon(t)$ Thus the average value of the phase comparator output $E_\epsilon(t)$ over the $k$th cycle is directly proportional to the average of the initial and final values of the input phase $\phi_i(t)$ during the cycle minus the value of the output phase $\phi_o(t)$ at $t^-_k$ during the cycle, where $t^-_k$ is the time of the $k$th negative step of the comparator output $E_\epsilon(t)$. The average voltage $\bar{e}_{\epsilon k}$ is inversely proportional to $2\pi$ minus the net variation of the input phase $\phi_i(t)$ during the cycle. Relation 52 has no singularity for finite values of $\dot{\phi}_i(t)$.

For the usual small values of $|\bar{e}_{\epsilon k}|$ and $|\Delta\phi_{ik}|$, Relation 52 can be well approximated by a simpler expression. Under these conditions, $$\bar{\phi}_{ik} \cong \phi_i(t^-_k) \quad (53)$$

and $$|\Delta\phi_{ik}| << 2\pi \quad (54)$$

Through use of Relations 53 and 54, Relation 52 may be rewritten $$\bar{e}_\epsilon(t) \Big|_{t=t^+_k}^{t^+_{k+1}} \cong k_\epsilon[\phi_i(t) - \phi_o(t)]t = t^-_k \quad (55)$$

where $$k = A/\pi$$

*Interface signals*

Interface signals are defined as those signals which must pass in either direction between the alignment system and the associated control system to permit the functioning of each. These signals are shown in FIG. 1a. Of these signals, only the output response $\theta_o(t)$ is a continuously variable analog quantity. The remaining interface logic signals are described below:

(1) Error-set signal $Y_b$. This logic signal is directed from the initializer 1 to the digital phase comparator 6. The purpose of the signal is to set the reversible step counter 20 in the latter component to the proper state $C_e$.

(2) Drive-enable signal $Y_c$. This logic signal is directed from the initializer 1 to the overload detector 4. The purpose of the signal is to reset the error-overload flip-flop F24 in the latter component so that $W_o = 0$, thereby enabling the servo loop.

(3) Counterclockwise and clockwise incremental motion signals $Y_f$ and $Y_g$. These logic signals are directed from the initializer 1 to the phase-modulating generator 3. The purpose of these signals is to command the control system to move the output shaft 23 toward the reference position during the alignment procedure. The control system responds to signals $Y_f$ and $Y_g$ from the alignment system in a manner corresponding to that in which it responds to inputs $\Delta\theta_i^+$ and $\Delta\theta_i^-$ from the computer, respectively; the latter two inputs must be held false during alignment. During alignment, a pulse train will normally appear at either $Y_f$ or $Y_g$; each pulse will advance or retard the phase of $E_i$ by $2\pi/m_1$ electrical radius, respectively, where $m_1$ is the integer discussed in the preceding description of the phase-modulating generator 3.

(4) Reference-carrier-angle-0 signal $Y_{\bar{\omega}_r}$. This logic signal is directed from the reference angle gate 14 to the initializer 1. The purpose of the logic signal is to indicate the instantaneous electric angle of the square-wave reference $E_r$. The value of the logic signal is defined as follows.

$$X_h = \begin{cases} 1, & 0 \leq \omega_r t - 2\pi p < 2\pi/m_1 \\ 0, & \text{otherwise} \end{cases}$$

where $\omega_r =$ frequency of the fundamental sinusoidal component of the reference carrier $E_r$ in radians per second, $t =$ time in seconds, $p =$ time function of integral value chosen to meet the conditions $$\frac{\omega_r t}{2\pi} - 1 < p \leq \frac{\omega_r t}{2\pi}$$

and the other symbols are as previously defined.

(5) Command-phase-set signal $Y_i$. This logic signal is directed from the initializer 1 to the phase-modulating generator 3. The purpose of the signal is to set the electrical angle $\Phi_i(t)$ of the phase-modulating generator output $E_i(t)$ equal to the electrical angle $\Phi_r(t)$ of the reference-carrier generator output $E_r(t)$.

(6) Error-overload signal $W_o$. This logic signal is directed from the overload detector 4 to the initializer 1, as well as to the computer. The signal is sent to the alignment system to indicate that a disturbance torque has caused the error-phase magnitude $|\phi_e(t)|$ to rise to a value beyond the capacity of the phase comparator 6. If this condition arises while the control system is being aligned, the initializer will terminate the alignment procedure and await another alignment command $W_a$ from the computer before proceeding.

OPERATION OF COMPONENTS

General

In the paragraphs which follow, operation of the alignment system will be described in general terms. A more detailed description will follow, when operation of the individual components is discussed.

The alignment procedure is initiated by an alignment-command pulse $W_a$ transmitted to the alignment system from a digital computer or other external source, as shown in FIG. 1a. The alignment command is given either as the first command after power to the control system is applied or interrupted, or whenever an error-overload signal $W_o$ is received by the computer.

After the alignment-command pulse $W_a$ is transmitted to the initializer from the computer, no further commands are sent to the control system by the computer until the alignment procedure is completed. The operations of the alignment system during alignment are listed below in sequence:

Phase comparator 6 has been presumed capable of detecting phase errors outside the range $\pm\pi$ radians. At the beginning of the alignment procedure, the phase comparator will produce an output voltage $E_e$ corresponding to some phase error within its range. However, to limit initial transient disturbance of the control system, the absolute value $|\phi_e(t)|$ of the phase error may be limited to $\pi$ radians by these operations:

(1) Read the reference-carrier-angle-0 signal $Y_{\Phi r}$ to determine the instantaneous electrical angle of the reference carrier $E_r(t)$. The electrical angles $\Phi_r(t)$ and $\Phi_i(t)$ of $E_r(t)$ and $E_i(t)$, respectively, are quantized before reading with a quantum width of $2\pi/m_1$ radians. In general, $Y_{\Phi r}$ will remain true for one period of clock train $C_1$ during each cycle of $E_r$; this clock period will immediately follow the false-to-true jump of $E_r$.

(2) Reset the error-overload flip-flop $F_{24}$ in the overload detector 4 while $Y_{\Phi r}=1$. This operation will cause the error-overload signal $W_o$ to equal 0, thereby closing the servo loop. This is accomplished by sending a $Y_c=1$ pulse from the initializer to the overload detector.

(3) Set the reversible step counter 20 in the phase comparator to 0 . . . 0 while $Y_{\Phi r}=1$. This operation is accomplished with a $Y_b=1$ pulse. The phase-error amplitude $|\phi_e|$ is thereby set to less than $\pi$ electrical radians.

(4) Set the electrical angle $\Phi_i(t)$ to 0 while $Y_{\Phi r}=1$. This operation is accomplished with a $Y_i=1$ pulse from the initializer to the counter in the phase modulating generator which is generating $E_i(t)$ as its output. The operation puts $E_i(t)$ in phase with $E_r(t)$.

(5) Set the step detector in the phase comparator while $Y_b=1$ by the means described in the following paragraph to inhibit a possible extraneous up-count pulse to the reversible step counter. Such an extraneous pulse would increase the phase-error amplitude $|\phi_e|$ beyond $\pi$ electrical radians. At this time an undesired up-count pulse would cause an unnecessarily large transient in the motion of the output shaft, as will be shown later; moreover, setting the step detector in this manner at the conclusion of alignment is essential to avoid a possible alignment error.

When the input angle $\Phi_i(t)$ and the error count $C_e(t)$ are set by a $C_2(t)$ pulse selected by the alignment system and transmitted by the signals $Y_i(t)$ and $Y_b(t)$, respectively, a 0-to-1 transition of $E_i(t)$ may occur or may have just occurred. Such a transition of $E_i(t)$ would excite the step-detector in the phase comparator and cause an undesired $C_1(t)$ up-count pulse to be transmitted by the signal $X_1(t)$ to the reversible step counter immediately after it had been properly set, resulting in an incorrect error count $C_e(t)$ and a phase-error amplitude $|\phi_e|$ exceeding $\pi$ electrical radians. To eliminate this possibility, $Y_b(t)$ is applied to the override-set inputs of flip-flops $F_{11}$ and $F_{12}$ in the step detector of the phase comparator (Ref: to FIG. 9). Therefore, at the time $Y_b(t)$ goes false, the conditions $$E_i=F_{11}=F_{12}=1$$

will always exist. Consequently, the reversible step counter in the phase comparator will not count up again until shortly after the next 0-to-1 transition of $E_i(t)$ occurs. No similar precaution is necessary for inhibiting a possible down-count by the reversible step counter of the phase comparator.

The output shaft 23 will now start moving toward the existing null to correct the initial phase error, which will be of no greater amplitude than $\pi$ electrical radians. A small amount of initial motion of $\theta_o$ away from the reference position may occur. Regardless of the direction of initial motion, the output shaft will rotate toward the reference position as a result of the following operation.

(6) If counterclockwise motion of the output shaft from the present position to the reference position is indicated by the counterclockwise-motion-direction signal condition $Y_d=1$, send pulses derived from the initializer input $Y_j$ to the counterclockwise-incremental-motion signal input $Y_f$ of the phase-modulating generator 3. Alternately, if the clockwise-motion-direction signal $Y_e=1$, send pulses derived from $Y_j$ to the input $Y_g$ of the phase-modulating generator. The transducer alignment channel 2 is so constructed that $$Y_d Y_e = 0$$

A "dead zone" wherein $Y_d=Y_e=0$ exists for $\theta_o$ which includes the reference position toward which alignment is directed. If in the dead zone at the beginning of operation 6, proceed to operation 8. If the output shaft is not in the dead zone, it will now move in the direction of this zone.

(7) Upon arriving in the dead zone, discontinue sending pulses to the phase-modulating generator 3 and proceed to operation 8. The transducer alignment channel 2 is constructed with a dead-zone width such that the phase-error amplitude $|\phi_e|$ will now be appreciably less than $\pi$ electrical radians.

The purpose of the remaining operations is to compensate for the possibility that a torque disturbance has caused the absolute phase error $|\phi_e|$ to exceed $\pi$ electrical radians when the output shaft arrives in the dead zone. These operations are similar to operations 1 through 4.

(8) Await the condition that the reference-carrier-angle-0 signal $Y_{\Phi r}=1$. In general, $Y_{\Phi r}$ will go true at the next false-true jump of $E_r$ and will remain true for one clock period. During this time, $$0 < \Phi_r(t) - 2\pi p \leq 2\pi/m_1$$

where all symbols are as previously defined.

(9) Although not strictly necessary, the error-overload flip-flop F24 may be reset to 1 again at this time while $Y_{\Phi r}=1$. So doing permits simpler programming of the initializer by permitting operations 8 through 11 to exactly duplicate operations 1 through 4.

(10) Set the reversible step counter 20 in the phase comparator to 0 . . . 0 with a $Y_b=1$ pulse while $Y_{\Phi r}=1$. (Here and elsewhere, notations such as 0 . . . 0 are used to indicate that a series of digits of unspecified length has been omitted. All omitted digits are assumed identical to the digit immediately preceding and to that succeeding the ellipsis.) The phase-error amplitude $|\Phi_e|$ is thereby set to less than $\pi$ electrical radians.

(11) Set the electrical angle $\Phi_1(t)$ to 0 while $Y_{\Phi r}=1$. This operation is accomplished with a $Y_1=1$ pulse from the initializer 1 to the variable-phase generator in the phase-modulating generator 3 which is generating $E_1(t)$ as its output. The operation puts $E_1(t)$ in phase with $E_r(t)$.

(12) Set the step detector in the phase comparator while $Y_b=1$ to inhibit a possible extraneous up-count pulse to the reversible step counter. Such an extraneous pulse would increase the phase error by $2\pi$ electrical radians and result in an alignment error by $2\pi/n$ mechanical radians. Without this precaution, such an alignment error would occur whenever the output shaft rotates counterclockwise during alignment.

In the absence of, or upon removal of, any disturbance torque, $\theta_0$ will now come to rest in a steady-state position within $\pm\pi/(m_1n)$ electrical radians of the reference position from which all future motion will be measured, where the symbols are as previously defined. It is significant that no contribution to this alignment error is made by the alignment system, either through any existent inaccuracy in the transducer alignment channel or other means. Additional alignment error due to the control system itself can be adjusted to a negligible value; in practice, the stability of such adjustment has been found to be high.

Detailed

Operation of the initializer and transducer-alignment-channel sections of the alignment system, as shown in FIG. 1a, will now be discussed in detail. Except where otherwise stated, all flip-flops employed are of the clocked RS type with override set and reset inputs which, when true, control the state of the flip-flop regardless of the state of the clock or set- or reset-enabling inputs. (Phister, Montgomery. *Logical Design of Digital Computers*. New York: John Wiley & Sons, Inc., 1958, pp. 115-117, 121 ff.) Symbols associated with the inputs and outputs of a typical flip-flop are shown with $F_{201}$ in FIG. 4. These symbols are defined as follows:

$P^Fa$=override-set input of flip-flop $F_a$,
$1^Fa$=set-enable input of flip-flop $F_a$,
$T^Fa$=clock or trigger input of flip-flop $F_a$,
$O^Fa$=reset-enable input fo flip-flop $F_a$,
$Q^Fa$=override-reset input of flip-flop $F_a$,
$F_a$=normal or true output of flip-flop $F_a$,
$\bar{F}_a$=false, complement, or bar output of flip-flop $F_a$.

Two significant equations governing inputs to the flip-flop are $$Q^Fa P^Fa=0$$
$$O^Fa 1^Fa=0$$

TRANSDUCER ALIGNMENT CHANNEL

Figure 2:
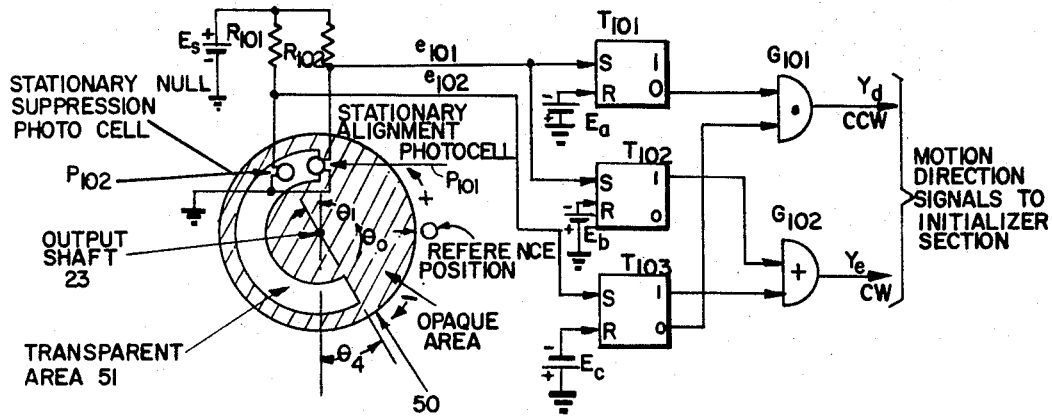
FIG. 2 is a logic diagram of the transducer alignment channel.

The logic diagram of the transducer alignment channel 2 is shown in FIG. 2. The main purpose of the transducer alignment channel is to indicate to the initializer 1 the direction in which the output shaft 23 should move to reach the reference position.

The only input to the transducer alignment channel is $\theta_0$=the output shaft angle in radians.

Outputs of the transducer alignment channel are $Y_d$=a logic signal commanding counterclockwise motion to approach the reference position during alignment,
$Y_e$=a logic signal commanding clockwise motion to approach the reference position during alignment.

As shown in FIG. 2, an opaque disk 50 is mounted on the output shaft 23 perpendicular to the shaft axis. This disk has a transparent section 51, $\pi+\theta_4$ radians wide, where $\theta_4>0$. Two photoconductive cells, $P_{101}$ and $P_{102}$, are mounted near the surface of the transducer disk at approximately equal radii from the disk center. These photocells are so mounted as to be sensitive to a beam of light (the source of which is not shown) passing through the transparent sector of the disk parallel to the output shaft. Measured from the center of the disk, the angle between the photocells is $\theta_1$; it is convenient to arrange the transducer alignment channel so that $$\theta_1=\theta_4$$

It will be assumed that this condition is met in the discussion which follows.

Figure 3:
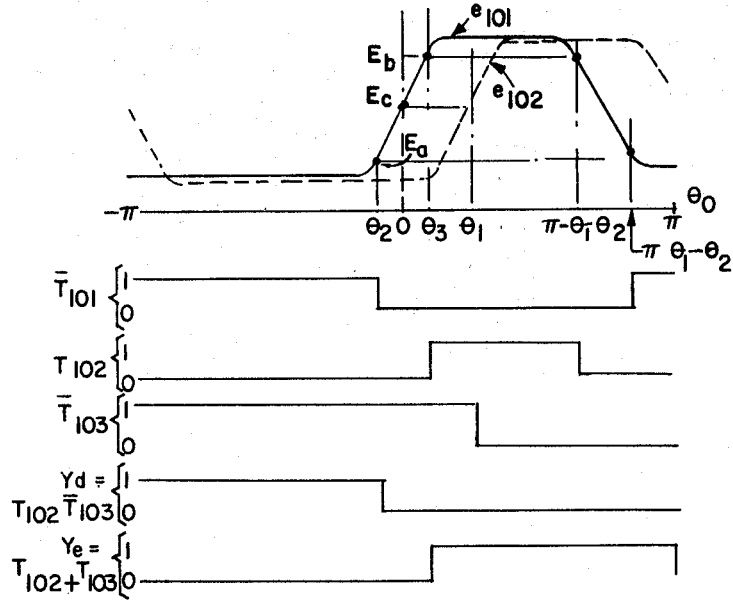
FIG. 3 illustrates the various waveforms relating to the transducer alignment channel.

Photocells $P_{101}$ and $P_{102}$ are connected through resistors $R_{101}$ and $R_{202}$, respectively, to the positive voltage source $E_s$, as shown in FIG. 2. The output voltages from $P_{101}$ and $P_{102}$ are designated $e_{101}$ and $e_{102}$, respectively. As shown in FIG. 3, $e_{101}$ will decrease with increasing illumination of $P_{101}$ due to the resultant increase of the conductance of this photocell; $e_{102}$ responds similarly to variation of the illumination of $P_{102}$.

The function of $P_{101}$ in association with the other elements shown in FIG. 2 is both to vary the outputs $Y_d$ and $Y_e$ in such a manner as to command the proper direction of output-shaft rotation toward the reference position during alignment and to establish a dead zone of suitable width about the reference position in which $Y_d=Y_e=0$. The photocell $P_{102}$ in association with the other elements in FIG. 2 assures that no other dead zone occurs at any other position of the output shaft.

The voltage $e_{101}$ is the input to triggers $T_{101}$ and $T_{102}$ in FIG. 2, set to fire at voltages $E_a$ and $E_b$, respectively. Similarly, $e_{102}$ is the input to trigger $T_{103}$, which is set to fire at $E_c$. As shown in FIG. 3, these firing voltages are so adjusted that $$e_{101}(\theta_2)=E_a$$
$$e_{101}(\theta_3)=E_b$$
$$e_{102}(\theta_1)=E_c=e_{102}(\pi)$$

The transducer alignment channel must be designed so that the following relationships exist between the shaft angles cited:

$$\theta_3<\theta_1=\theta_4<\tfrac{1}{2}(\pi-\theta_3)$$
$$-\pi/n<\theta_2<0$$
$$0<\theta_3<\pi/n$$

As previously defined, $n$ is a positive integer denoting the ratio of phase shift in $E_o$ to variation of $\theta_0$. FIG. 2 also illustrates the manner in which the trigger outputs are connected to gates $G_{101}$ and $G_{102}$.

The following logic equations govern operation of the transducer alignment channel:

$$T_{101}=\begin{cases}1, & e_{101}\geq E_a\\ 0, & e_{101}<E_a \text{ i.e.}\\ & \theta_2\leq\theta_0\leq\pi-\theta_1-\theta_2\end{cases}$$

$$T_{102}=\begin{cases}1, & e_{101}\geq E_b, \text{ i.e.}\\ & \theta_3\leq\theta_0\leq\pi-\theta_1-\theta_3\\ 0, & e_{101}<E_b\end{cases} \text{ Trigger equations}$$

$$T_{103}=\begin{cases}1, & e_{102}\geq E_c, \text{ i.e.}\\ & \theta_1\leq\theta_0\leq\pi\\ 0, & e_{102}<E_c\end{cases}$$

Output and gate equations:

$$Y_d=G_{101}=T_{101}T_{103}$$
$$Y_e=T_{102}=T_{102}+T_{103}$$

ALIGNMENT-SYSTEM INITIALIZER SECTION

Figure 4:
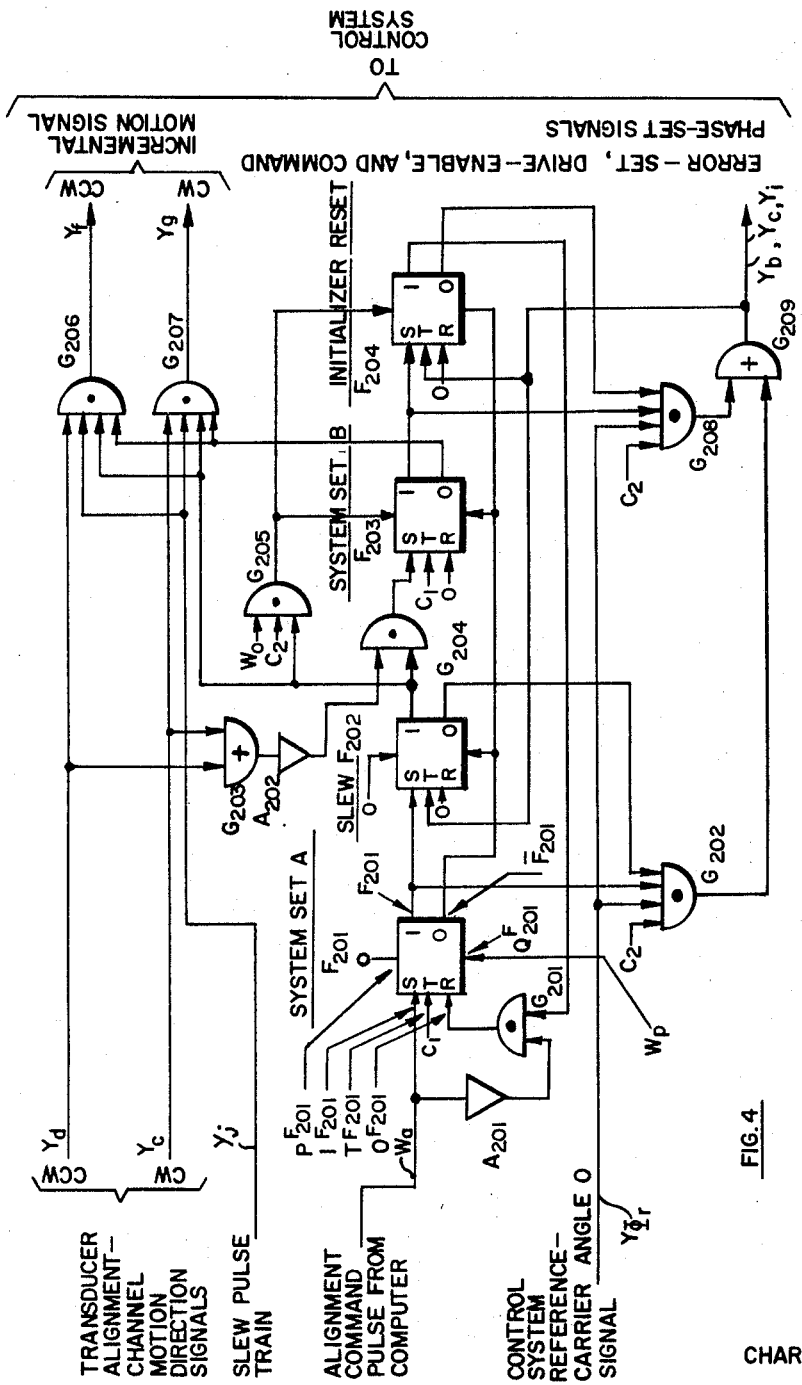
FIG. 4 is a logic diagram of the alignment system initializer section.

The logic diagram of the initializer 1 appears in FIG. 4. The purpose of the initializer is to generate, upon receipt of a logical command to align from the computer or other external source, the logical signals necessary to align the incremental digital control system to the predetermined reference position from which all succeeding motion is to be measured. In general, the sequence in which such alignment signals are sent to the control system is determined by the design of the initializer, while the timing with which alignment signals are emitted is determined by logical signals sent to the initializer by the transducer alignment channel and the control system to indicate the values of the significant state variables of the control system.

The following signals are inputs to the initializer:

$W_a$=alignment-command signal from the computer or other external source,
$W_o$=error-overload signal from the control system,
$Y_d$=transducer-alignment-channel counterclockwise-motion signal,
$Y_e$=transducer-alignment-channel clockwise-motion signal,
$Y_j$=slew-pulse train from the reference-carrier generator 17 or an external source,
$Y_{\Phi_r}$=reference-carrier-angle-0 signal from the control system.

Figure 5:
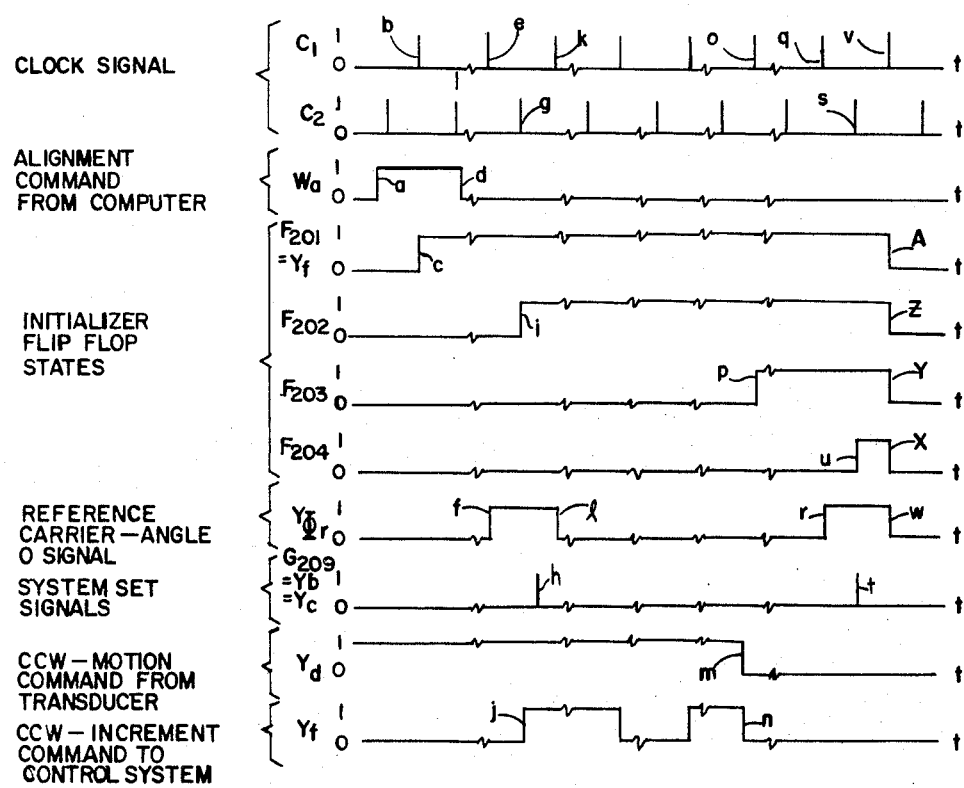
FIG. 5 illustrates the various waveforms relating to the alignment system.

In addition, the two-phase clock generator 24 supplies the primary and secondary clock trains $C_1$ and $C_2$, respectively, to both the initializer and the control system. These clock signals are shown in FIG. 5.

The following outputs are sent to the control system by the initializer:

$Y_b$=error-set signal,
$Y_c$=drive-enable signal,
$Y_f$=counterclockwise incremental-command pulse train,
$Y_g$=clockwise incremental-command pulse train,
$Y_i$=command-phase-set signal.

As shown by FIG. 4, the initializer consists of four flip-flops, along with associated gates and logical inverters. When the initializer is dormant, all flip-flops are in the false state; this condition is assured when power is first applied to the alginment system by the preset signal P applied to $F_{201}$, which is momentarily true when power is first applied and thereafter remains false. This signal may be supplied by the associated digital computer or some other external source. The alignment procedure starts when the normally false input $W_a$ goes true for any period of duration exceeding $T+\tau_c$, where T is the clock period and $\tau_c$ is the clock-pulse length. This $W_o$ signal enables flip-flop input $1^F 201$, causing $F_{201}$ to go true on the next $C_1$ pulse. As alignment proceeds, $F_{202}$, $F_{203}$, and $F_{204}$ go true in succession, until all of the initializer flip-flops are simultaneously true. The next $C_1$ pulse after $F_{204}$ goes true or $W_o$ goes false, whichever occurs last, causes all flip-flops to return to the false state. The initializer then remains in this dormant state until another align-command pulse is received at $W_o$.

Successive steps in the alignment procedure are initiated by individual gates, each of which is enabled only when the first of an adjacent pair of flip-flops is true and the other is false, proceeding from left to right in FIG. 4. Thus the condition $F_{201}\overline{F}_{202}=1$ is necessary to enable $G_{206}$ and $G_{207}$, and the condition $F_{203}\overline{F}_{204}=1$ is necessary to enable $G_{209}$. In FIG. 4, each flip-flop is labelled to indicate the step in the alignment procedure which is performed when that flip-flop is in the true state and the succeeding flip-flop is false. Thus $F_{201}$ sets the control-system elements for the first time, $F_{202}$ slews the control-system output shaft to the dead zone, $F_{203}$ sets the control-system elements for the second time to eliminate the effects of disturbance torque, and $F_{204}$ resets the initializer to the dormant state.

A periodic train of pulses is continuously applied at $Y_j$ from the reference-carrier generator or an external source; during alignment, these pulses are emitted at $Y_f$ or $Y_g$ to the appropriate incremental-command input of the control system to cause slewing (turning) toward the reference position of the output shaft. The direction of incremental motion commanded by the initializer is determined by gates $G_{206}$ and $G_{207}$ in response to $Y_d$ and $Y_e$. When the output shaft of the control system enters the dead zone and $Y_d=Y_e=0$, $A_{202}=1$, thereby permitting $F_{203}$ to go true on the next $C_1$ pulse.

If a torque disturbance should cause the reversible step counter 20 in the phase comparator of the control system to overload at any time during alignment, the signal $W_o=1$ is applied to $G_{205}$ of the initializer. As soon as $F_{202}=1$, the next $C_2$ pulse generates an override set signal $$G_{205}=P^F 203=P^F 204=1$$

thereby terminating alignment. Since $W_o$ is also directed to the computer to indicate when a noncorrectable error due to torque overload occurs, the computer can be programmed to emit $W_a$ pulses repeatedly when necessary until alignment is successfully completed.

The purpose of the preceding discussion was to cover the salient features of the initializer. Further discussion of its actual operation will be included in the following section, which relates to operation of the initializer, the transducer alignment channel, and the control system together during alignment.

The following logic equations govern operation of the initializer:

Logic-inverter equations:

$$A_{201}=\overline{W}_0$$

$$A_{202}=\overline{G}_{203}$$

Flip-flop $F_{201}$ input equations:

$$P^F 201=0$$
$$1^F 201=X_1$$
$$T^F 201=C_1$$
$$0^F 201=G_{201}$$
$$Q^F 201=W_p$$

Flip-flop $F_{202}$ input equations:

$$P^F 202=0$$
$$1^F 202=F_{201}$$
$$T^F 202=G_{209}$$
$$0^F 202=0$$
$$Q^F 202=\overline{F}_{201}$$

Flip-flop $F_{203}$ input equations:

$$P^F 203=G_{205}$$
$$1^F 203=G_{204}$$
$$T^F 203=C_1$$
$$0^F 203=0$$
$$Q^F 203=\overline{F}_{201}$$

Flip-flop $F_{204}$ input equations:

$$P^F 204=G_{205}$$
$$1^F 204=F_{203}$$
$$T^F 204=G_{209}$$
$$0^F 204=0$$
$$Q^F 204=F_{201}$$

Gate equations:

$$G_{201}=A_{201}F_{204}$$
$$G_{202}=C_2F_{201}\overline{F}_{202}Y_{\Phi_r}$$
$$G_{203}=Y_d+Y_e$$
$$G_{204}=A_{202}F_{202}$$
$$G_{205}=C_2F_{202}W_o$$
$$G_{206}=Y_f=F_{202}\overline{F}_{203}Y_jY_d$$
$$G_{207}=Y_g=F_{202}\overline{F}_{203}Y_jY_e$$
$$G_{208}=C_2F_{203}\overline{F}_{204}Y_{o_r}$$
$$G_{209}=Y_b=Y_c=G_{202}G_{208}$$

These equations are implemented in the logic diagram shown in FIG. 4.

Figure 6:
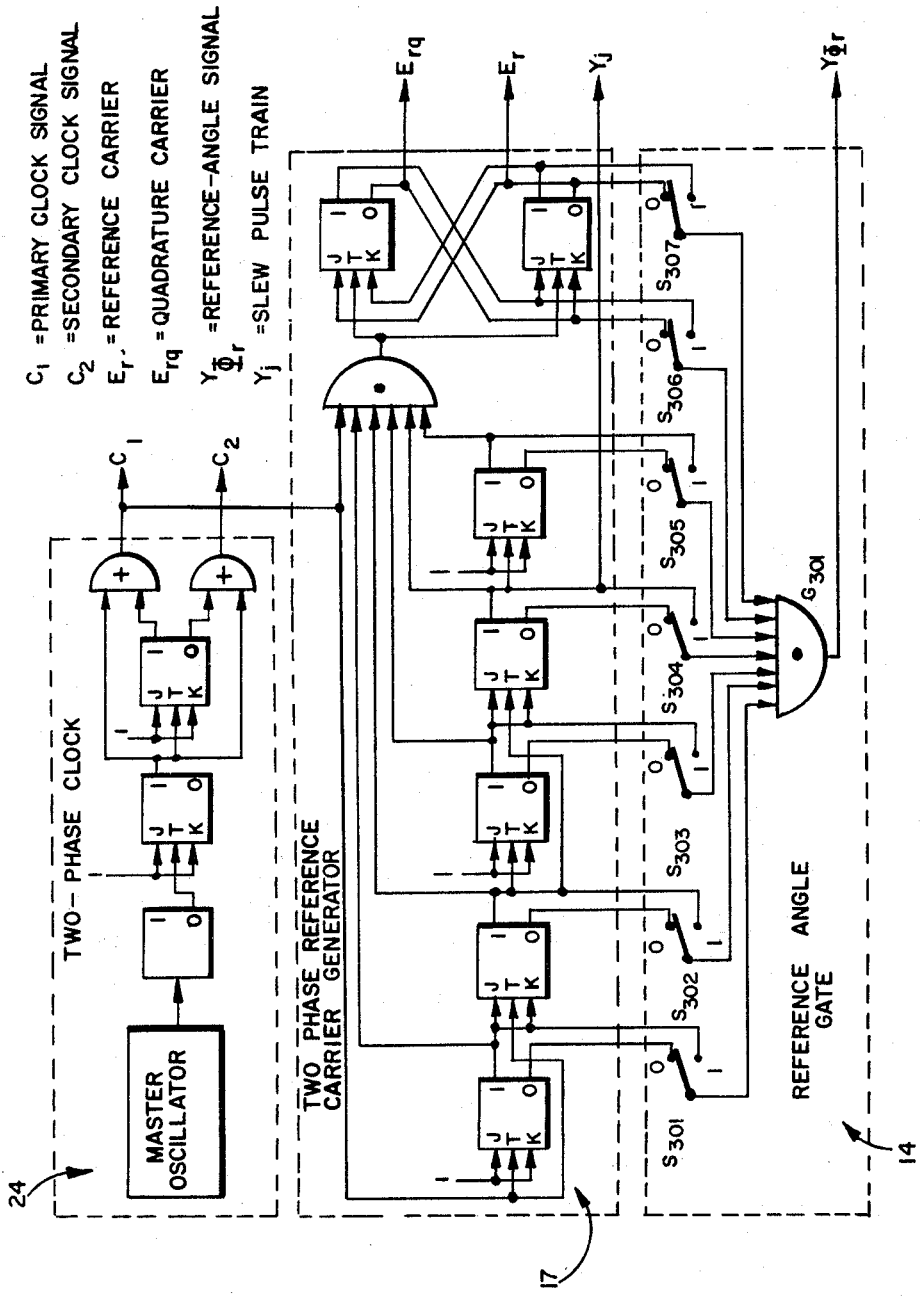
FIG. 6 is a logic diagram of the reference-angle gate and the associated two-phase reference-carrier generator.

The logic diagram of the two-phase clock 24, the two-phase reference carrier generator 17 and the reference-angle gate 14 appear in FIG. 6.

Clock 24 and generator 17 are described in detail in applicant's co-pending application Serial No. 394,977, filed September 8, 1964, entitled "Digital Reference Source."

The reference-angle gate 14 is electrically connected to the carrier generator 17 as schematically shown in FIG. 6.

The function of the reference-angle gate is to provide a single logical output, the normally false enabling signal $Y_{\Phi_r}(t)$, to indicate when the quantized instantaneous value of the total angle $$\Phi_r(t) = \omega_1 t + \phi_1(t)$$

of the input-command carrier $E_i(t)$ is between predetermined limits. The signal $Y_{\Phi_r}(t)$ goes true once during each cycle of $E_i(t)$.

The inputs to the reference-angle gate include the normal and complement outputs of each flip-flop in the reference-carrier generator 17. From each such flip-flop either the normal or complement output is directed to the AND-gate $G_{301}$ by the corresponding switches $S_{301}$ to $S_{307}$.

The reference-angle gate emits an enabling signal $$Y_{\Phi_r} = 1$$

when, and only when, $$K < \frac{t}{\tau} - pm_1 \leq K+1$$

where K represents the specific value of the number $C_r$ to which the reference-angle gate has been set (Ref.: to relation 18 in the referenced application Serial No. 394,977 for the derivation of $C_r$), $m_1$ has been previously defined, and $p$ is a non-negative integer chosen to satisfy relation 57.

The output of the gate $G_{301}$ has been referred to as an enabling signal because its value is significant only after sufficient time has elapsed after a $C_1$ pulse terminates to permit all flip-flops in the reference-carrier generator to settle. The output of $G_{301}$ is read by using it as one input of an AND-gate, the other input of which is either $C_1$ or $C_2$.

The number K is set by switches $S_{301}$ through $S_{307}$ in accordance with the relationship $$K = S_{307} 2^6 + (S_{307}\overline{S_{306}} + \overline{S_{307}}S_{306})2^5 + S_{305}2^4 \\ + S_{304}2^3 + S_{303}2^2 + S_{301}2^0$$

More than one reference-angle gate may be attached to the reference-carrier generator in parallel. Each such gate may be set to a different value of K.

Figure 7:
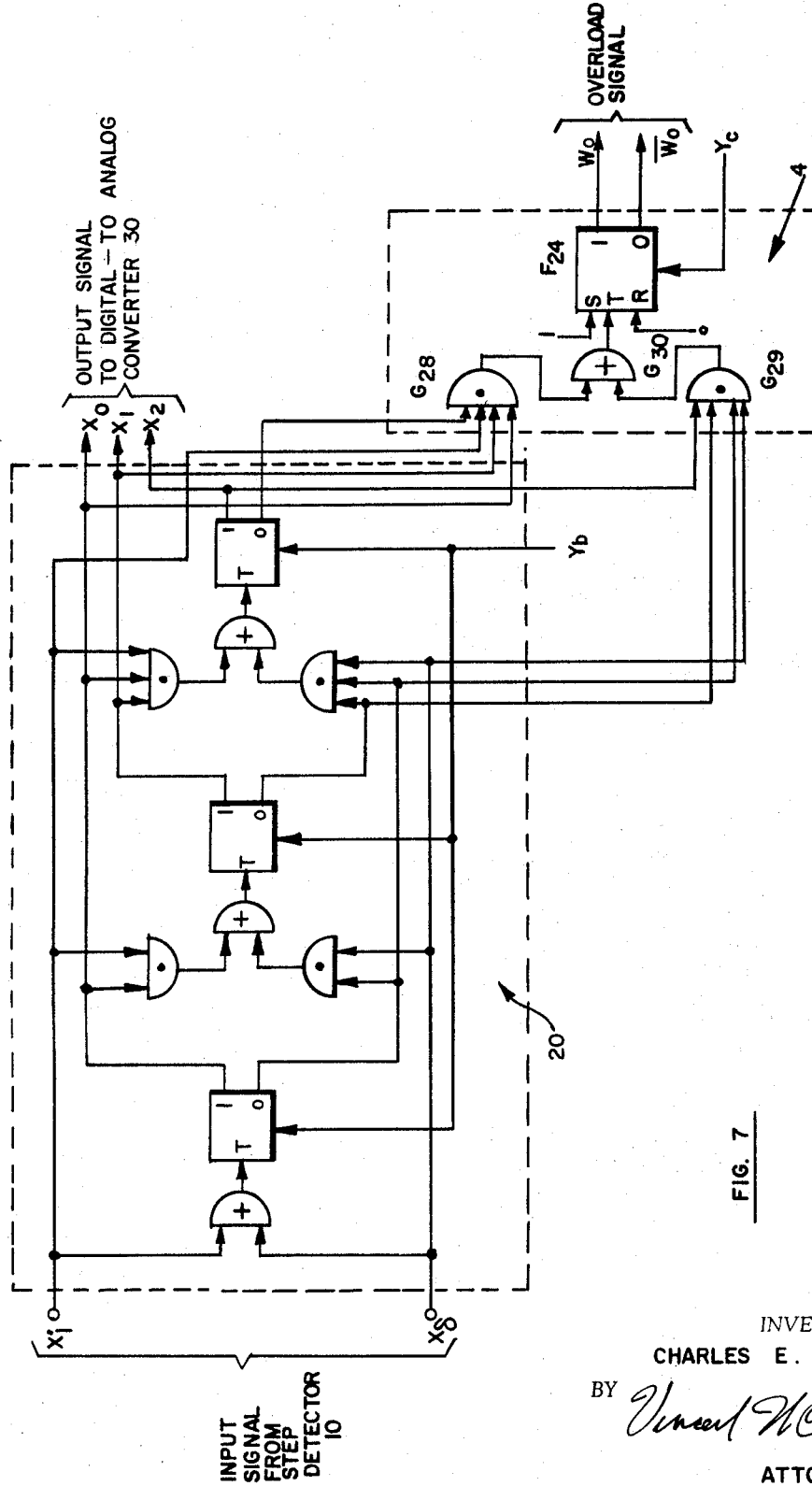
FIG. 7 is a logic diagram of the reversible step counter and the associated overload detector.

The logic diagram of the overload detector 4 and the reversible step counter 20 appear in FIG. 7. The reversible step counter is described in detail in applicant's co-pending application Ser. No. 379,997, filed July 2, 1964, now U.S. Patent No. 3,329,895, entitled "Digital Phase Comparator Capable of Indicating Greater Than 360 Degree Phase Differences."

The overload detector 4 is electrically connected to the step counter 20 as schematically shown in FIG. 7.

The purpose of the overload detector 4 is to provide an overload signal if the magnitude of the phase angle $\phi_\epsilon$ rises sufficiently to overload the reversible step counter 20.

The AND-gate $G_{28}$ receives as inputs the signal $X_1$ and the normal outputs of each of the counter flip-flops. The AND-gate $G_{29}$ receives as inputs the signal $X_0$ and the complement outputs of each of the counter flip-flops.

When the counter 20 is overloaded a pulse will be sent from either $G_{28}$ or $G_{29}$, depending upon the overload state of the counter, to the OR-gate 30 supplies a trigger pulse to the error overload flip-flop $F_{24}$. Flip-flop $F_{24}$ will be set when the counter is overloaded. This flip-flop can be reset only by the alignment system which supplies the reset signal $Y_c$.

The normal output of $F_{24}$ is $W_o$, a signal which is directed to the computer (not shown) and to the alignment system. The complement output is $\overline{W_o}$ a signal which is directed to the loop-inhibit switch 5. The servo-loop is enabled only when $W_o = 0$.

The logic diagram of the variable-phase generator appears in FIG. 8 This phase generator is described in detail in applicant's co-pending application Ser. No. 368,090 referenced previously. The purpose of illustrating the phase generator is to show where the signal $Y_i$ is applied to the flip-flops $F_0, F_1 \ldots F_{p-1}$. The signal $Y_i$ is substituted for the signal P normally applied there.

Figure 9:
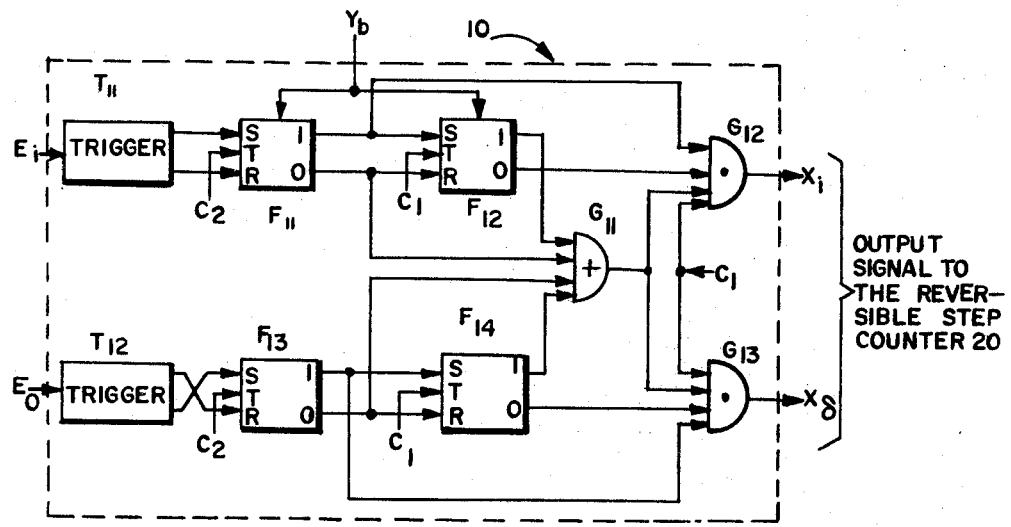
FIG. 9 is a logic diagram of the digital step detector.

Referring to FIG. 9, there is shown the logic diagram of the step detector 10. Detector 10 is described in detail in applicant's co-pending application Ser. No. 379,997 referenced previously. The purpose of illustrating the step detector is to show where the signal $Y_b$ is applied to flip-flops $F_{11}$ and $F_{12}$.

COMBINED OPERATION OF ALIGNMENT-SYSTEM COMPONENTS

Operation of the initializer, the transducer alignment channel, and an incremental digital control system together during alignment will now be discussed in detail. Relevant waveforms are shown in FIG. 5. It will be assumed that the control-system output shaft 23 is initially positioned in such a manner that $$-\pi < \theta_0 < \theta_2$$

making counterclockwise rotation of the output shaft during alignment necessary. It will also be assumed that the reversible step counter 20 of the control system has not been overloaded and will not be overloaded during the alignment procedure, because detection and correction of an overload by the alignment system has already been discussed. Thus, before and during alignment, it will be assumed that $$Y_e = W_o = 0$$

The alignment procedure will be discussed with specific reference to FIG. 5, which shows waveforms relating to the alignment system. Indefinite lapses of time of arbitrary duration are indicated by jagged discontinuities in the waveforms of this figure. Clock trains $C_1$ and $C_2$ are supplied by the two-phase clock generator 24 which is used in common with the associated incremental phase-comparison control system. With certain exceptions, $C_1$ pulses are employed to trigger flip-flops, while $C_2$ pulses are used to interrogate gates enabled by flip-flops after they have settled and to apply override-set inputs to flip-flops triggered by $C_1$ without interfering with their normal action.

Alignment will be discussed below in steps corresponding to the titles assigned to the flip-flops in FIG. 4.

(1) *System set A.*—Alignment is initiated when the asynchronous alignment command $W_0$ from the computer goes true at $a$ in FIG. 5, thereby enabling input $1^F201$ with a true signal. The $C_1$ pulse at $b$ then causes $F_{201}$ to go true at $c$. Although the $W_0$ pulse shown goes false at $d$ and is only slightly longer than $T+\tau_c$, a longer pulse would have been equally satisfactory.

No further action is possible until, in approximate synchronization with the $C_1$ pulse at $e$, the reference-carrier-angle-0 signal $Y_{\Phi_r}$ goes true at $f$. The signal $Y_{\Phi_r}$ remains true for one clock period, during which $$0 < \Phi_r(t) - 2\pi p \leq 2\pi/m_1 \qquad (56)$$

where $\Phi_r(t)$ is the reference-carrier angle and $m_1$ and $p$ are defined as before. The gate $G_{202}$ is now interrogated by the $C_2$ pulse at $g$, leading to an output pulse $h$ at $G_{209}$ which causes $F_{202}$ to be set at $i$, sets the phase comparator 6 of the control system with a $Y_b$ pulse, and sets the phase-modulating generator 3 of the control system so that, until the next $C_1$ pulse at $k$, $$0 < \Phi_1(t) \leq 2\pi/m_1$$

where the symbols are as previously defined. Had the control loop been open, it would be closed at this time by a $Y_c$ pulse. The input carrier $E_1$ has now been placed in phase with the reference carrier $E_r$. In addition, $G_{206}$ has been enabled, permitting a counterclockwise incremental command signal $Y_f$ to be transmitted to the control system at $j$. Finally, in response to the $C_1$ pulse at $k$, $Y_{\Phi_r}$ goes false at $l$.

(2) *Slew.*—With $\overline{F}_{202}F_{203}Y_d=1$, incremental command signals continue to be sent from the initializer to the control system. Counterclockwise motion of the output shaft 23 continues until $Y_d$ goes false asynchronously at $m$, indicating that the output shaft has entered the dead zone. Incremental-command pulses to the control system stop immediately at $n$. The above action enables flip-flop input $1^F203$, permitting the $C_1$ pulse at $o$ to cause $F_{203}$ to go true at $p$.

(3) *System set B.*—No further action occurs until, in approximate synchronization with the $C_1$ pulse at $q$, $Y_{\Phi_r}$ again goes true at $r$, indicating that the conditions of Relation 56 have again been met. As before $Y_{\Phi_r}$ remains true for one clock period until the $C_1$ pulse at $v$ occurs. Since now $F_{203}F_{204}Y_{\Phi_r}=1$, the $C_2$ pulse at $s$ appears at the output of $G_{209}$ at $t$ to set $F_{204}$ at $u$ and to set the phase comparator of the control system with a $Y_b$ pulse. The control system is now aligned. Finally, in approximate synchronization with the $C_1$ pulse at $v$, $Y_{\Phi_r}$ goes false at $u$.

(4) *Initializer reset.*—At this time, the only operation which remains is to reset the initializer to the dormant condition with all flip-flops in the false state. Because $F_{204}=A_{201}=1$, in response to the $C_1$ pulse at $v$, $F_{204}$ is reset to the false state at A. An override reset results from making $Q^F{}_{202}=Q^F{}_{203}=Q^F{}_{204}=1$. In response to these signals, $F_{202}$, $F_{203}$, and $F_{204}$ return to false states at $z$, $y$, and $x$. The initializer is now again in the dormant state.

If the initial position of the output shaft had required clockwise rotation during alignment, the initial states of signals from the transducer alignment channel would have been $\overline{Y}_d=Y_e=1$. The alignment system would have functioned as described, except for emitting incremental motion pulses at $Y_g$ instead of $Y_f$. If the output shaft had initially been in the dead zone, the same alignment procedure would have been followed, but no incremental-command pulses would have been emitted at $Y_f$ or $Y_g$.

The location of the alignment position can be varied over a limited range within the dead zone by varying the range of the reference carrier angle over which $Y_{\Phi_r}$ in FIG. 5 remains true. The range, previously expressed by Relation 56 over which $Y_{\Phi_r}$ is true now becomes $$q < \frac{m_1\Phi_r(t)}{2\pi} - m_1 p \leq q+1, \ 0 \leq q < m_1$$

where $q$ is a positive integer determined to the base 2 by selection of the output of each different flip-flop of the reference-carrier generator to which the reference-angle gate is connected. In this manner the alignment position can be moved electrically by vary small increments equal to the resolution of the associated incremental digital control system.

Here the non-negative integer $p$ is a function of time bounded by the conditions $$\frac{\Phi_r(t)}{2\pi} \geq p(t) > \frac{\Phi_r(t)}{2\pi} - 1 \quad (57)$$

Although the invention has been described and illustrated in detail, it is to be clearly understood that the same is by way of illustration and example only and is not to be taken by way of limitation, the spirit and scope of this invention being limited only by the terms of the appended claims.

I claim:
1. An alignment system for accurately aligning the shaft of an incremental digital control servo to a predetermined reference position comprising in combination:
   an incremental digital control servo for positioning said shaft in accordance with a net number of input control pulses, said servo including an output transducer having a plurality of null positions;
   an alignment transducer for determining the preferred direction of rotation of said shaft to a predetermined reference position, said alignment transducer having a single null position corresponding to said reference position and providing a first direction signal when said rotation is in one direction from said reference position and for supplying a second direction signal when said rotation is in an opposite direction from said reference position;
   an initializer for receiving an alignment-command signal and said first and second signals and for providing a net number of input control pulses proportional to said input signals to said control servo upon receipt of said alignment-command signal so as to cause said shaft to rotate towards said reference position.

2. The combination recited in claim 1 wherein said alignment transducer comprises:
   a disk having an opaque sector and a transparent sector, said disk mounted to said shaft such that the shaft axis is perpendicular to said disk;
   first and second stationary photocells mounted at approximately equal radii from the center of said disk and approximately parallel to the surface of said disk, said photocells spaced apart from each other a distance substantially less than the width of said transparent sector;
   a stationary source of light rays aligned with said photocells on the opposite side of said disk so as to pass light rays through said disk onto said photocells when said transparent sector is aligned with said photocells;
   means for detecting the output of said photocells and providing said first direction signal when said transparent sector is opposite both of said photocells and providing said second direction signal when said opaque sector is opposite both of said photocells, said means adapted to not provide said direction signals when said second photocell is opposite said transparent sector and said first photocell is opposite both said opaque sector and said transparent sector.

3. The combination recited in claim 2 wherein said detecting means comprises:
   a first level detector connected to said first photocell for providing a first level signal when said first photocell is opposite said transparent sector;
   a second level detector connected to said first photocell for providing a second level signal when said second photocell is opposite said opaque sector;
   a third level detector connected to said second photocell for providing a third level signal when said second photocell is opposite both said transparent and opaque sectors;
   first gate means for receiving said first and third level signals and providing said first direction signal in the absence of both said first and third level signals;
   second gate means for receiving said second and third level signals and providing said second direction signal upon receipt of either said second or said third level signals.

4. An alignment system for accurately aligning the shaft of an incremental digital control servo to a predetermined reference position comprising in combination:
   an incremental digital control servo for positioning said shaft in accordance with a net number of input control pulses;
   an alignment transducer for determining the preferred direction of angular rotation of said shaft to a predetermined reference position and for supplying a first direction signal when said rotation is in one direction from said reference position and for supplying a second direction signal when said rotation is in an opposite direction from said reference position;

an initializer for receiving an alignment-command signal and said first and second direction signals and for providing a net number of input control pulses proportional to said direction signals to said control servo upon receipt of said alignment-command signal so as to cause said shaft to rotate towards said reference position.

5. The combination recited in claim 4 wherein said alignment transducer comprises:
   a disk having an opaque sector and a transparent sector, said disk mounted to said shaft such that the shaft axis is perpendicular to said disk;
   first and second stationary photocells mounted at approximately equal radii from the center of said disk and approximately parallel to the surface of said disk, said photocells spaced apart from each other a distance substantially less than the width of said transparent sector;
   a stationary source of light rays aligned with said photocells on the opposite side of said disk so as to pass light rays through said disk onto said photocells when said transparent sector is aligned with said photocells;
   means for detecting the output of said photocells and providing said first direction signal when said transparent sector is opposite both of said photocells and providing said second direction signal when said opaque sector is opposite both of said photocells, said means adapted to not provide said direction signals when said second photocell is opposite said transparent sector and said first photocell is opposite both said opaque sector and said transparent sector.

6. The combination recited in claim 5 wherein said detecting means comprises:
   a first level detector connected to said first photocell for providing a first level signal when said first photocell is opposite said transparent sector;
   a second level detector connected to said first photocell for providing a second level signal when said second photocell is opposite said opaque sector;
   a third level detector connected to said second photocell for providing a third level signal when said second photocell is opposite both said transparent and opaque sectors;
   first gate means for receiving said first and third level signals and providing said first direction signal in the absence of both said first and third level signals;
   second gate means for receiving said second and third level signals and providing said second direction signal upon receipt of either said second or said third level signals.

7. An alignment system comprising in combination:
   first means for servoing a mechanical displacement to a null position, said means comprising a phase generator for receiving input control pulses and providing a first periodically varying signal the phase angle of which varies as a function of the net number of input control pulses, a phase comparator for producing an error signal representative of the phase difference between said first signal and a second periodically varying signal which varies as a function of said mechanical displacement from said null position, a compensated driver for receiving said error signal and providing an amplified and compensated signal proportional to said error signal, an electromechanical means for converting said compensated signal into said mechanical displacement;
   second means for determining the preferred direction of mechanical displacement to a predetermined reference position and for providing signals indicative of said preferred direction;
   third means for receiving an alignment-command signal and said direction signals and providing a net number of input control pulses proportional to said direction signals to said phase generator upon receipt of said alignment command signal till said mechanical displacement is substantially aligned to said reference position.

8. The combination recited in claim 7 wherein is included means for disabling said first means when the magnitude of said error signal rises above a predetermined level.

9. The combination recited in claim 7 wherein said second means comprises:
   a disk having an opaque sector and a transparent sector, said disk connected to rotate with said mechanical displacement;
   first and second stationary photocells mounted at approximately equal radii from the center of said disk and approximately parallel to the surface of said disk, said photocells spaced apart from each other a distance substantially less than the width of said transparent sector;
   a stationary source of light rays aligned with said photocells on the opposite side of said disk so as to pass light rays through said disk onto said photocells when said transparent sector is aligned with said photocells;
   means for detecting the output of said photocells and providing a first signal indicative of a first preferred direction when said transparent section is opposite both of said photocells and providing a second signal indicative of a second preferred direction when said opaque sector is opposite both of said photocells, said means not providing signals when one of said photocells is opposite said transparent sector and the other of said photocells is opposite both said opaque sector and said transparent sector.

References Cited

UNITED STATES PATENTS

| | | | |
|---|---|---|---|
| 2,866,506 | 12/1958 | Hierath et al. | |
| 3,209,222 | 9/1965 | Holy | 318—19 XR |
| 3,239,735 | 3/1966 | Raider et al. | 318—28 XR |
| 3,324,364 | 6/1967 | Caruthers | 318—18 |
| 3,340,447 | 9/1967 | MacDonald | 318—18 |

BENJAMIN DOBECK, *Primary Examiner.*